(12) United States Patent
Gaida et al.

(10) Patent No.: US 7,210,474 B2
(45) Date of Patent: May 1, 2007

(54) SAW BLADE WITH CUTTING DEPTH GAUGE

(75) Inventors: Olivier Philippe Gaida, Russange (FR); Franck Jacques Dominique Pichoff, Gorcy (FR)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 125 days.

(21) Appl. No.: 11/087,312

(22) Filed: Mar. 23, 2005

(65) Prior Publication Data

US 2006/0213495 A1    Sep. 28, 2006

(51) Int. Cl.
 *B28D 1/04* (2006.01)

(52) U.S. Cl. .................. 125/15; 125/13.01; 451/541; 451/547; 30/166.3; 83/520; 83/676; 83/835

(58) Field of Classification Search ............. 125/13.01, 125/15; 451/541, 547, 546; 299/39.3; 404/87; 83/666, 676, 835; 30/520, 166.3, 388, 347, 30/355
See application file for complete search history.

(56) References Cited

U.S. PATENT DOCUMENTS

| 3,866,504 | A |   | 2/1975  | Claesson et al. |
|-----------|---|---|---------|-----------------|
| 4,432,264 | A |   | 2/1984  | Scott |
| 4,515,055 | A |   | 5/1985  | Scott |
| 4,516,560 | A | * | 5/1985  | Cruickshank et al. ......... 125/15 |
| 4,776,251 | A |   | 10/1988 | Carter, Jr. |
| 4,776,402 | A | * | 10/1988 | Meikle et al. ............. 168/48.2 |
| 4,813,325 | A |   | 3/1989  | Gelman |
| 4,904,130 | A | * | 2/1990  | Gorman .................. 408/16 |
| 4,930,487 | A | * | 6/1990  | Younger ................. 125/15 |
| 5,392,759 | A | * | 2/1995  | Kwang .................. 125/15 |
| 6,277,017 | B1| * | 8/2001  | Ji ....................... 451/547 |
| 6,422,229 | B1| * | 7/2002  | Padrinao et al. .......... 125/25 |
| 6,632,131 | B1| * | 10/2003 | Buchholz ............... 451/547 |
| 6,729,220 | B2| * | 5/2004  | Curtsinger et al. ........ 83/666 |
| 6,845,767 | B2| * | 1/2005  | Sakarcan ............... 125/15 |
| 7,004,157 | B2| * | 2/2006  | Sakita et al. ............ 125/15 |
| 2003/0200853 | A1 | | 10/2003 | Gongola |
| 2004/0129125 | A1 | | 7/2004  | Colquhoun |
| 2004/0149114 | A1 | | 8/2004  | Brach |

FOREIGN PATENT DOCUMENTS

| DE | 26 54 625    | 6/1978 |
| DE | 200 22 132   | 4/2001 |
| EP | 0514822      | 11/1992 |
| EP | 0 770 443    | 5/1997 |
| EP | 1072355      | 1/2001 |
| EP | 1 103 347    | 5/2001 |
| WO | WO8801557    | 3/1988 |
| WO | WO 2004/060598 | 7/2004 |

* cited by examiner

*Primary Examiner*—Eileen P. Morgan
(74) *Attorney, Agent, or Firm*—Sampson & Associates, P.C

(57) ABSTRACT

Cutting tools are provided that include a circular core with a cutting means located on its periphery, a central bore to receive an arbor of a rotating power tool and one or more perforations extending through the central core. The perforations are disposed along a circumference disposed concentrically with, and between, the central bore and the periphery. The perforations are arranged to form an annular window through the core which corresponds to a predetermined cutting depth during rotational operation of the tool.

20 Claims, 2 Drawing Sheets

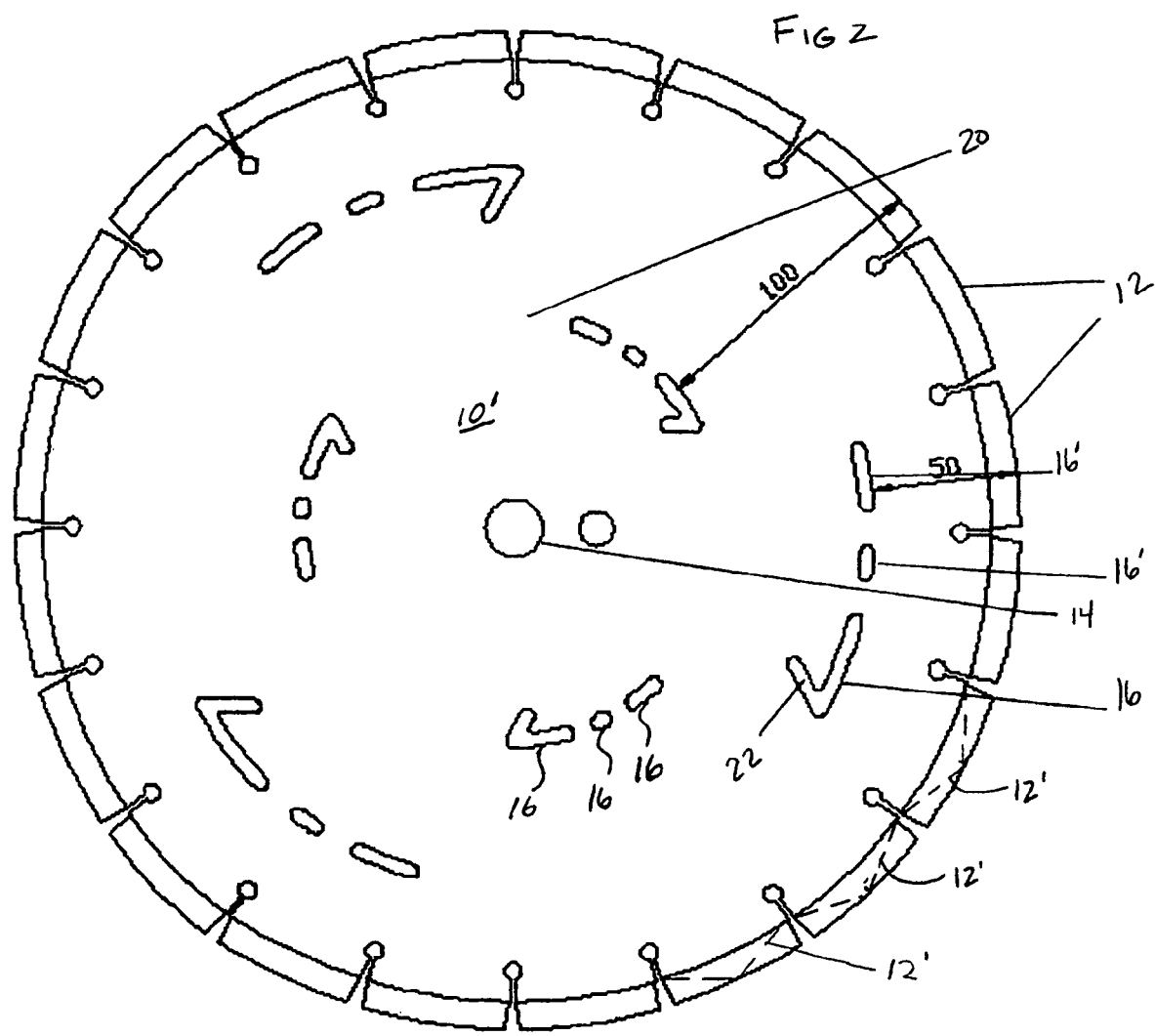

SAW BLADE WITH CUTTING DEPTH GAUGE

BACKGROUND

1. Technical Field

This invention relates to saw blades, and more particularly to a saw blade having an integral depth indicator.

2. Background Information

Cutting tools are often used to cut or drill to a desired depth which is only partway through a workpiece. In these situations it is necessary to control the depth of the cut. Some cutting tools, such as power saws and walk behind floor saws, are often equipped with a device that allows one to adjust the depth of cut. However, many such devices are difficult to adjust accurately. Other devices, such as depth gauges imprinted onto saw blades, tend to be difficult to see, particularly in low-light conditions, and may be worn away or otherwise obscured during use. Often the operator must stop the saw to measure the actual depth achieved. Additional adjustments must then be made if the target depth has not been achieved. Oftentimes, such measurement must be repeated several times to ensure that a desired depth of cut has been achieved without overcutting.

Disadvantageously, cutting must be generally stopped and then restarted for each of these measurements.

Thus a need exists for a device and method that addresses the aforementioned drawbacks.

SUMMARY

In an aspect of the invention, a cutting tool includes a core having a cutting periphery, a central bore configured to receive a drive mechanism of a rotating power tool, and a plurality of perforations extending through the core. The perforations are bounded in 360 degrees by the core and define a notional, annular window through the core during rotational operation of the blade. The window corresponds to a predetermined depth of cut.

In another aspect of the invention, a method is provided for fabricating a saw blade having an integral depth gauge. The method includes providing a solid circular core having a plurality of cutters disposed along a periphery thereof, providing the core with a central bore configured to receive an arbor of a rotating power tool, and extending a plurality of perforations through the core, so that the perforations are bounded in 360 degrees by the core. The perforations are spaced along at least one circumference disposed concentrically with, and between, the central bore and the periphery, so that the perforations define a notional, annular window through the core during rotational operation of the blade, which window forms an integral depth gauge corresponding to a predetermined depth of cut.

In a further aspect of the invention, a saw blade with integral depth gauge includes a circular core having a plurality of cutting means disposed along a periphery thereof, bore means for retaining the blade on an arbor of a rotating power tool, and perforation means extending through the core. The perforation means are bounded in 360 degrees by the core, and are spaced along at least one circumference disposed concentrically with, and between, the central bore means and the periphery. The perforation means define a notional, annular window through the core during rotational operation of the blade, so that the window forms an integral depth gauge corresponding to a predetermined depth of cut.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIG. 2 is a view similar to that of FIG. 1, on an enlarged scale, of an alternate embodiment of the present invention.

DETAILED DESCRIPTION

Figure 1:
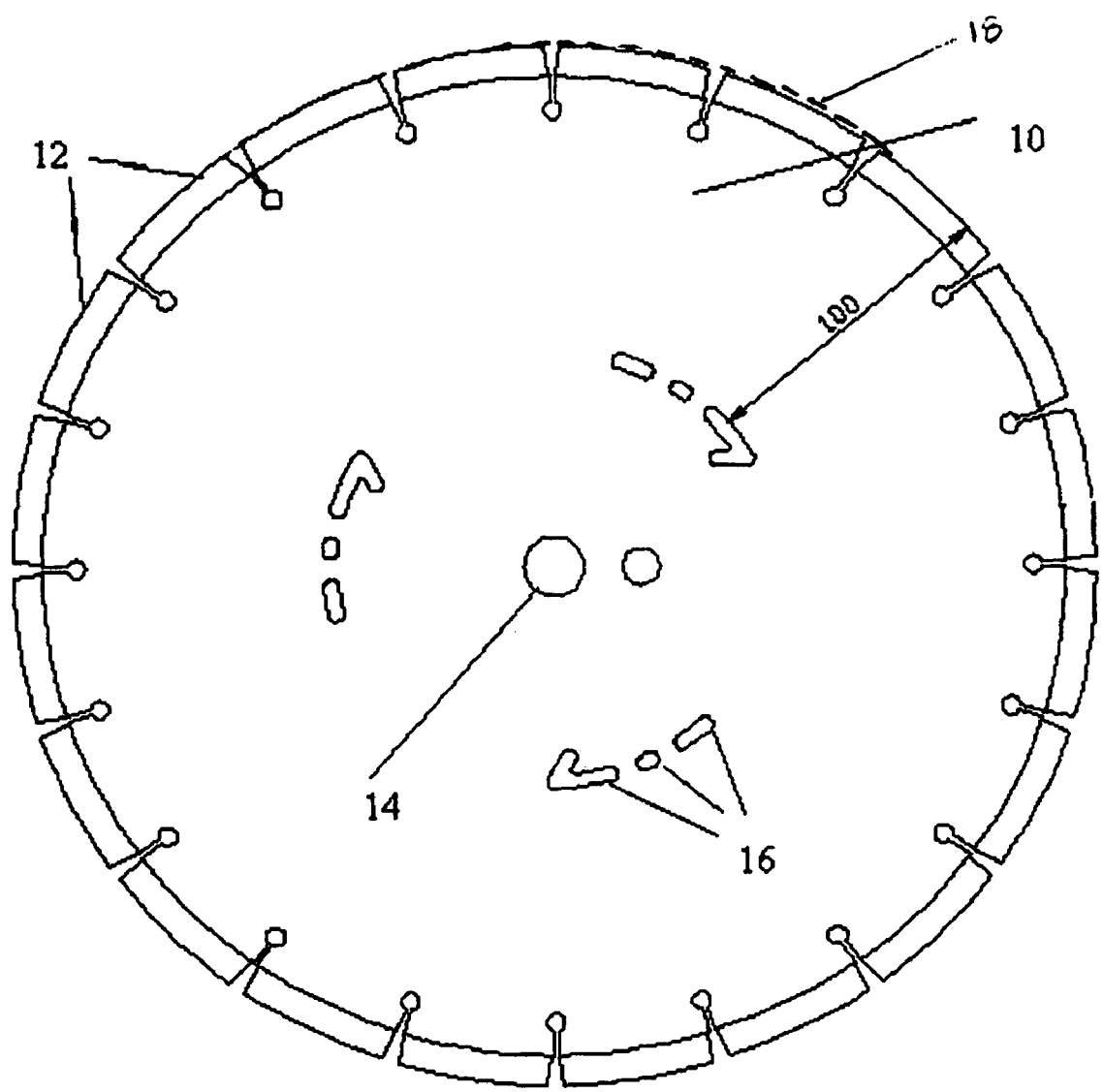
FIG. 1 is a side view, with optional portions shown in phantom, of an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

Referring to FIGS. 1–2, embodiments of the present invention are discussed in detail. These embodiments advantageously facilitate accurate cutting to one or more specific depths.

Briefly, an embodiment of the present invention includes a circular saw blade 10 with peripheral cutting teeth (e.g., segments) 12 and a central bore 14. The central bore 14 is configured to receive arbor means, e.g. a spindle or drive shaft (not shown), to retain the blade on a conventional power saw or walk behind floor saw. The blade 10 contains perforations 16 spaced along a circumference disposed concentrically with, and between, bore 14 and the periphery of blade 10. When the saw blade is in use, perforations 16, due to the well-known 'persistence of vision' effect, appear to the user as a continuous (e.g., notional) ring which enables the user to visually discern when a desired cutting depth relative to the ring has been achieved.

The term "axial" when used in connection with an element described herein, refers to a direction relative to the element, which is substantially parallel to its center of rotation when the element is installed on arbor means.

Blade 10 may include substantially any type of circular saw blade known to those skilled in the art. For convenience, blade 10 is shown having peripheral cutting teeth 12. However, the skilled artisan will recognize that many variations of blade 10, such as described hereinbelow, may also be used with embodiments of the invention. Aspects of the invention may also be applicable for use with other types of rotating cutting devices where cutting occurs at the peripheral edge of a rotating member. An example of a saw blade suitable for use with embodiments of the invention includes a diamond abrasive saw blade disclosed in U.S. Patent Publication No. US2004/0149114 to Saint-Gobain Abrasives, Inc.

In the embodiment shown in FIG. 1, blade 10 is a masonry-cutting circular saw blade. This blade 10 includes a metallic core 20, having a central bore or aperture 14 through which the blade 10 may be mounted and fastened to the spindle of a circular saw (not shown) in a conventional manner, e.g., with a threaded fastener. As shown, the core 20 is substantially circular in shape, and may comprise substantially any material having sufficient strength for the particular cutting application. Examples of materials suitable for some applications include steel, aluminum, titanium, bronze, their composites and alloys, and combinations thereof. For some applications, reinforced plastics may be used to construct the core.

Cutters 12 may be fabricated as conventional abrasive segments. Such segments generally include abrasive grain brazed or otherwise secured to the surface of core 20. Substantially any conventional abrasives may be used, such as, but not limited to, alumina in fused, sintered, and/or sol gel form, silica, silicon carbide, zirconia-alumina, fused or sintered alloys of alumina with at least one ceramic oxide selected from the group consisting of $M_gO$, $C_oO$, $TiO_2$, $V_2O_3$ $Cr_2O_3$, ceria, boron suboxide, garnet, and emery. Superabrasive grains may also be used, including but not limited to diamond and cubic boron nitride (CBN), with or without a metal coating.

Moreover, as an optional variation, the cutters may take the form of teeth, such as shown in phantom at 12' in FIG. 2. Teeth 12' may be of nominally any size and shape commonly used on saw blades, such as to cut relatively soft materials such as wood, plastic, and the like. Teeth 12' may be provided with conventional hardened tips, such as fabricated from tungsten carbide, and/or may be provided with the abrasive grain described hereinabove.

In a still further variation, the blade may be provided with a substantially smooth periphery (e.g., an abrasive continuous rim) 18 as shown in phantom in FIG. 1. Such a continuous abrasive rim may be formed by sintering, brazing, electroplating, or electroforming a layer or matrix of abrasive grain onto the outer perimeter of the tool body or core 20. A particular example of such an embodiment includes an abrasive saw having a single layer of diamond grain brazed or electroplated onto a continuous rim. Other exemplary embodiments include a continuous rim having a metal matrix composite of abrasive in a sintered metal powder bond.

Moreover, although the embodiments shown and described include circular saw blades, aspects of the invention may be applied to substantially any type of rotating cutting tools, including milling heads or core drill bits. For example, perforations 16, etc., may be applied to the cylindrical cores of otherwise conventional core drill bits, which typically include segmented abrasive cutting elements or teeth 12, having metal matrix composite or single layer abrasive bonded thereto.

As shown, central bore 14 is provided to receive a drive mechanism, e.g., including an arbor, of a rotating power tool, as is known in the art, to retain the blade and to facilitate rotation of the blade as the arbor turns. Although the bore 14 is circular in the embodiments shown, those skilled in the art will recognize that substantially any bore geometry may be used, provided it is capable of suitably engaging a particular arbor.

Referring to FIG. 1, blade 10 includes a set of perforations 16 spaced along circumferences spaced concentrically with, and between, bore 14 and the periphery of the blade 10. In the embodiment shown, all of the perforations 16 are disposed along at least one common circumference, e.g., at the same distance from bore 14. Although such positioning may be desired for some embodiments, those skilled in the art should recognize that the perforations may be radially offset from one another, i.e., they may be disposed on mutually distinct circumferences, as long as they form a single notional window. A single notional ring will thus be formed by any group of perforations in which each perforation resides on a common circumference with at least one other perforation in the group.

Blade 10' of FIG. 2 is similar to blade 10 of FIG. 1, though including a second set of perforations 16' disposed to form a second notional ring disposed concentrically with the first notional ring formed by perforations 16.

As discussed in greater detail hereinbelow, the perforations 16, 16' effectively define one or more discrete cutting depths that are clearly visible to a user when the blade 10, 10' is in use. The sets of perforations 16, 16' may be provided with various shapes, such as substantially circular, oval, or V-shaped, as shown. Moreover, in particular embodiments, the perforations do not intersect the periphery of the wheel, i.e., they are bounded a full 360 degrees by core 20. Such internal positioning provides a depth gauge suitable for demarking relatively deep cuts, without substantially adversely affecting the structural integrity of the blade 10, 10'.

As mentioned above, perforations 16, 16' define a notional ring, which appears as a continuous annular window through the blade 10, 10'. This notional ring or window serves as a demarcation on the blade which enables the user to visually discern when a desired cutting depth relative to the perforations 16 has been achieved. This demarcation is substantially permanent, as it will not fade or become otherwise obscured over time by wear. This ring is also effectively 'back-lit' by ambient light passing therethrough, which advantageously provides high visibility even in low light conditions.

It should be understood in light of the teachings hereof, that the level of visibility afforded by the notional rings/windows is determined in part by the area of the perforations. A larger collective area generally corresponds to a brighter or more transparent ring or ring portion. Thus, the relatively large cumulative area of perforations 16 along the radially outermost circumference of each notional ring defined thereby (e.g., provided by the oval, circular, and one leg of the V-shaped perforations) tends to provide a relatively high level of transparency. The other, obliquely angled leg 22 of the V-shaped perforations extends radially inward of the aforementioned perforation portions. Legs 22 thus advantageously increase the width (radial dimension) of the notional rings to increase the total viewing area with only minimal effect on the structural integrity of the saw blade 10, 10'. However, since these oblique legs 22 provide far less cumulative area than the other perforation portions, the portion of the notional rings defined thereby will tend to be comparatively darker or less transparent.

Thus, in these embodiments, the radially outermost portions of the notional rings will be brighter or more transparent than the radially innermost portions thereof. This progression advantageously provides a relatively wide viewing window, without compromising the visibility at the ring portions associated with the shallowest depths of cut.

This progression also serves as a gradation, by which a user may customize a cutting depth. For example, in the embodiments shown and described, each notional ring provides a depth gauge having at least three distinct gradations. These gradations include the radially outermost edge of the notional ring, a middle transition radius where the 'brighter' or relatively transparent window portion transitions to the 'darker' or relatively opaque window portion, and the radially innermost edge of the ring defined by an end of oblique legs 22. The user may thus use any of these distinct depth indicators during operation of the saw blade 10, 10'.

Moreover, although two distinct window portions have been shown and described, those skilled in the art should recognize that any number of distinct window portions, such as provided by alternating 'lighter' and 'darker' portions, and/or portions of progressively darker portions such as provided by radially offset perforations as discussed above, may be provided without departing from the spirit and scope of the present invention.

In particular embodiments, the ratio of collective area within the relatively transparent window portion to that of the relatively opaque window portion is at least about 2:1, but may be as high as 5:1 or more as shown. Moreover, as shown, the radial dimension of the relatively opaque window portion is approximately equal to or greater than that of the relatively transparent window portion.

The embodiments shown and described herein include perforations 16 of specific size and shape and relative position. However, those skilled in the art should recognize that perforations 16 may be provided with any number of shapes, sizes and orientation, provided they define a notional ring discernable by a user at desired rotational speeds, in accordance with the claims hereof. Perforations 16 may be made using any conventional process known in the art, such as by machining (including drilling and/or routing) or stamping, etc.

The perforations 16 may be placed such that they correlate to any depth value that is convenient for a user or is known to those skilled in the art. Although the embodiments shown and described herein include three sets of three perforations 16 disposed along discrete diameters, those skilled in the art will recognize that any number of perforations may be used, provided they are capable of producing a notional ring discernable by a user for determining depth(s) of cut as set forth herein.

The following illustrative example is intended to demonstrate certain aspects of the present invention. It is to be understood that this example should not be construed as limiting.

EXAMPLE

An otherwise conventional saw blade (NORTON™ SERVICE LINE, Super Asphalt Evo, 350 mm outside diameter, with diamond cutting teeth, manufactured by Saint-Gobain Abrasives S. A., Bascharage, Luxembourg) was modified to include perforations 16 substantially as shown and described hereinabove with respect to blade 10 of FIG. 1. Sets of perforations 16 were disposed along diameters spaced respectively 50 mm and 100 mm radially inward of the periphery of the saw blade 10.

This blade 10 was mounted to a walk behind floor saw (Clipper CSB1P13, manufactured by Saint-Gobain Abrasives S. A., Bascharage, Luxembourg) and used to cut into a floor. During cutting, a user was able to sight across the floor to the notional rings formed in blade 10 by perforations 16. Thus, while in operation, the perforations 16 provided a visual means by which the user was able to adjust the depth of cut. Cutting progressed until one of the notional rings was disposed at a predetermined elevation relative to the floor. An accurate and regular depth of cut was successfully achieved.

Although the present invention has been described with respect to circular saw blades, the skilled artisan will recognize that substantially any type of cutting or grinding tool may be used, without departing from the spirit and scope of the invention. For example, the perforations shown and described herein may be applied to abrasive or non-abrasive circular saw blades, including conventional steel core, segmented or continuous rim abrasive wheels, core drill bits, and other cutting tools, without departing from the spirit and scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A cutting tool comprising:
a core having a cutting periphery;
a central bore configured to receive a drive mechanism of a rotating power tool;
a plurality of perforations extending through said core, said perforations being bounded in 360 degrees by said core;
said perforations defining a notional, annular window through said core during rotational operation of said blade;
said window corresponding to a predetermined depth of cut;
wherein said perforations extend along at least one common circumference disposed concentrically with, and between, the central bore and the periphery.

2. The cutting tool of claim 1, comprising a saw blade having a solid circular core, wherein said window forms an integral depth gauge corresponding to a predetermined depth of cut.

3. The cutting tool of claim 1, wherein said cutting periphery comprises a continuous rim having abrasive grain disposed thereon.

4. The cutting tool of claim 1, wherein said cutting periphery comprises a plurality of teeth.

5. The cutting tool of claim 4, wherein said teeth comprise abrasive grain.

6. The cutting tool of claim 5, wherein said teeth comprise segments.

7. The cutting tool of claim 1, wherein said perforations are disposed to form a plurality of mutually distinct annular windows, respectively corresponding to distinct depths of cut.

8. The cutting tool of claim 1 wherein the perforations are variably shaped.

9. The cutting tool of claim 8 wherein the perforations are formed in shapes selected from the group consisting of substantially V-shaped, circular and oblong.

10. A cutting tool comprising:
a core having a cutting periphery;
a central bore configured to receive a drive mechanism of a rotating power tool;
a plurality of perforations extending through said core, said perforations being bounded in 360 degrees by said core;
said perforations defining a notional, annular window through said core during rotational operation of said blade;
said window corresponding to a predetermined depth of cut;

wherein:
said window has gradations defined by a collective area of said perforations at predetermined locations of said window;
said gradations including a relatively transparent window portion and a relatively opaque window portion.

11. The cutting tool of claim 10, wherein a ratio of said collective area within said relatively transparent window portion to that of said relatively opaque window portion is at least about 2:1.

12. The cutting tool of claim 11, wherein said ratio is at least about 5:1.

13. The cutting tool of claim 10, wherein a dimension in a cutting direction of said relatively opaque window portion is at least that of said relatively transparent window portion.

14. The cutting tool of claim 10, wherein said cutting tool comprises a circular saw and said relatively transparent window portion is disposed at a radially outer portion of said window, and said relatively opaque window portion is disposed at a radially inward portion of said window.

15. The cutting tool of claim 14, wherein at least one of said perforations is substantially V-shaped.

16. The cutting tool of claim 15, wherein:
the substantially V-shaped perforation includes a first leg extending along at least one circumference, and a second leg extending obliquely relative to the first leg;
the first leg forming the relatively transparent window portion; and
the second leg forming the relatively opaque window portion.

17. The cutting tool of claim 16, wherein said window comprises a graduated depth gauge having at least three demarcations corresponding to distinct depths of cut, said demarcations including a radially outermost edge of said window, a radially innermost edge of said window, and a boundary between said relatively transparent window portion and said relatively opaque window portion.

18. The cutting tool of claim 17, wherein said radially outermost edge includes an edge of said relatively transparent window portion and said radially innermost edge includes an edge of said relatively opaque window portion.

19. A method of fabricating a saw blade having an integral depth gauge, the method comprising:
(a) providing a solid circular core having a plurality of cutters disposed along a periphery thereof;
(b) providing the core with a central bore configured to receive an arbor of a rotating power tool;
(c) extending a plurality of perforations through the core, wherein the perforations are bounded in 360 degrees by the core; and
(d) extending the perforations along at least one common circumference disposed concentrically with, and between, the central bore and the periphery;
wherein the perforations define a notional, annular window through the core during rotational operation of said blade, which window forms an integral depth gauge corresponding to a predetermined depth of cut.

20. A saw blade with integral depth gauge, the saw blade comprising:
a circular core having a plurality of cutting means disposed along a periphery thereof;
bore means for retaining the blade on an arbor of a rotating power tool;
perforation means extending through said core, said perforation means being bounded in 360 degrees by said core;
wherein said perforation means extend along at least one common circumference disposed concentrically with, and between the central bore means and the periphery;
said perforation means defining a notional, annular window through said core during rotational operation of said blade;
wherein said window forms an integral depth gauge corresponding to a predetermined depth of cut.

* * * * *